(12) United States Patent
Ohashi

(10) Patent No.: US 12,094,157 B2
(45) Date of Patent: Sep. 17, 2024

(54) INFORMATION PROCESSING APPARATUS, INFORMATION PROCESSING METHOD, AND PROGRAM

(71) Applicant: Sony Interactive Entertainment Inc., Tokyo (JP)

(72) Inventor: Yoshinori Ohashi, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 391 days.

(21) Appl. No.: 17/431,476

(22) PCT Filed: Feb. 26, 2019

(86) PCT No.: PCT/JP2019/007329
§ 371 (c)(1),
(2) Date: Aug. 17, 2021

(87) PCT Pub. No.: WO2020/174586
PCT Pub. Date: Sep. 3, 2020

(65) Prior Publication Data
US 2022/0138982 A1    May 5, 2022

(51) Int. Cl.
*G06T 7/73*      (2017.01)
*G06T 15/20*     (2011.01)
*G06T 19/20*     (2011.01)
*G06V 40/10*     (2022.01)

(52) U.S. Cl.
CPC ........... *G06T 7/73* (2017.01); *G06T 15/20* (2013.01); *G06T 19/20* (2013.01); *G06V 40/103* (2022.01); *G06T 2219/2016* (2013.01)

(58) Field of Classification Search
CPC ........... G06T 7/73; G06T 15/20; G06T 19/20; G06V 40/103
See application file for complete search history.

(56) References Cited

U.S. PATENT DOCUMENTS

2013/0336550 A1* 12/2013 Kapur ............... G06V 40/103
                                                        382/128
2018/0253603 A1*  9/2018 Yamamoto ......... G06V 20/52

FOREIGN PATENT DOCUMENTS

JP    6470859    *  1/2019
JP    6470859 A     2/2019

OTHER PUBLICATIONS

Machine translation of JP 6470859, Espacenet, pp. 1-60, Oct. 6, 2023 (Year: 2023).*

(Continued)

*Primary Examiner* — Edward Park
(74) *Attorney, Agent, or Firm* — Matthew B. Dernier, Esq.

(57) ABSTRACT

An information processing apparatus that generates an image in a virtual space to be presented to a user detects information as to a position of a target object in a real space, places a virtual object corresponding to the target object at a position in the virtual space obtained on the basis of the detected information as to the position of the target object in the real space, acquires user body size data representing the size of a body of the user in the real space, and determines the position in the virtual space at which the virtual object is to be placed, using the detected information as to the position of the target object in the real space, and the user body size data about the user in the real space.

9 Claims, 5 Drawing Sheets

(56) References Cited

OTHER PUBLICATIONS

International Preliminary Report on Patentability and Written Opinion for corresponding PCT Application No. PCT/JP2019/007329, 13 pages, dated Sep. 10, 2021.
International Search Report for corresponding PCT Application No. PCT/JP2019/007329, 2 pages, dated May 14, 2019.

* cited by examiner

INFORMATION PROCESSING APPARATUS, INFORMATION PROCESSING METHOD, AND PROGRAM

TECHNICAL FIELD

The present invention relates to an information processing apparatus, an information processing method, and a program.

BACKGROUND ART

A technique of body tracking in which markers called trackers are attached to predetermined positions on portions of a body of a user, and the positions of the markers are estimated through photographing the markers from outside, is widely known.

In addition, a technique is known in which the posture of a character in a virtual space, such as a game space or a VR (Virtual Reality) space, is determined on the basis of the positions of portions of a real body of a user estimated by this body tracking, information as to the position of a virtual head portion thereof, the positions of hands thereof, etc., is obtained, and an image of a body of the character in the virtual space is generated on the basis of the above information. Furthermore, a technique of generating an image as viewed from the position of the point of view of a character in a virtual space (i.e., what is generally called a first-person point of view) and presenting the generated image to a user, thereby presenting an image that provides a feeling of immersion as if the user were in the virtual space, is known.

SUMMARY

Technical Problems

In such a conventional technique of displaying an image in a virtual space, the point of view of a character in the virtual space is set so as to match the actual stature of a user to cope with a movement or change in posture of the user in a real space. However, the size, e.g., the stature, of the character is set irrespective of the actual stature of the user, and therefore, even in the case where the stature of the character in the game is significantly different from the stature of the user, the point of view thereof will be placed at a position that matches the stature of the user.

Furthermore, the conventional technique has a problem in that the user is given an uncomfortable feeling that a movement of the body of the character does not match a movement of his or her own body, because, despite the first-person point of view, the relative positional relations between the positions of the head and hands and feet of the character are different from the relative positional relations between the positions of the head and hands and feet of the user himself or herself.

Due to such a factor and so on, the conventional technique of displaying an image in a virtual space has a problem of a reduced sense of immersion into a character.

The present invention has been conceived in view of the above circumstances, and an object thereof is to provide an information processing apparatus, an information processing method, and a program that are able to achieve an enhanced sense of immersion into a character.

Solution to Problems

An embodiment of the present invention that solves the above problems of the conventional example is directed to an information processing apparatus that generates an image in a virtual space to be presented to a user, the apparatus including means for detecting information as to a position of a target object in a real space, means for placing a virtual object corresponding to the target object at a position in the virtual space obtained on the basis of the detected information as to the position of the target object in the real space, means for acquiring user body size data representing a size of a body of the user in the real space, and means for determining the position in the virtual space at which the virtual object is to be placed, using the detected information as to the position of the target object in the real space, and the user body size data about the user in the real space.

Advantageous Effect of Invention

The present invention is able to achieve an enhanced sense of immersion into a character.

DESCRIPTION OF EMBODIMENT

Figure 1:
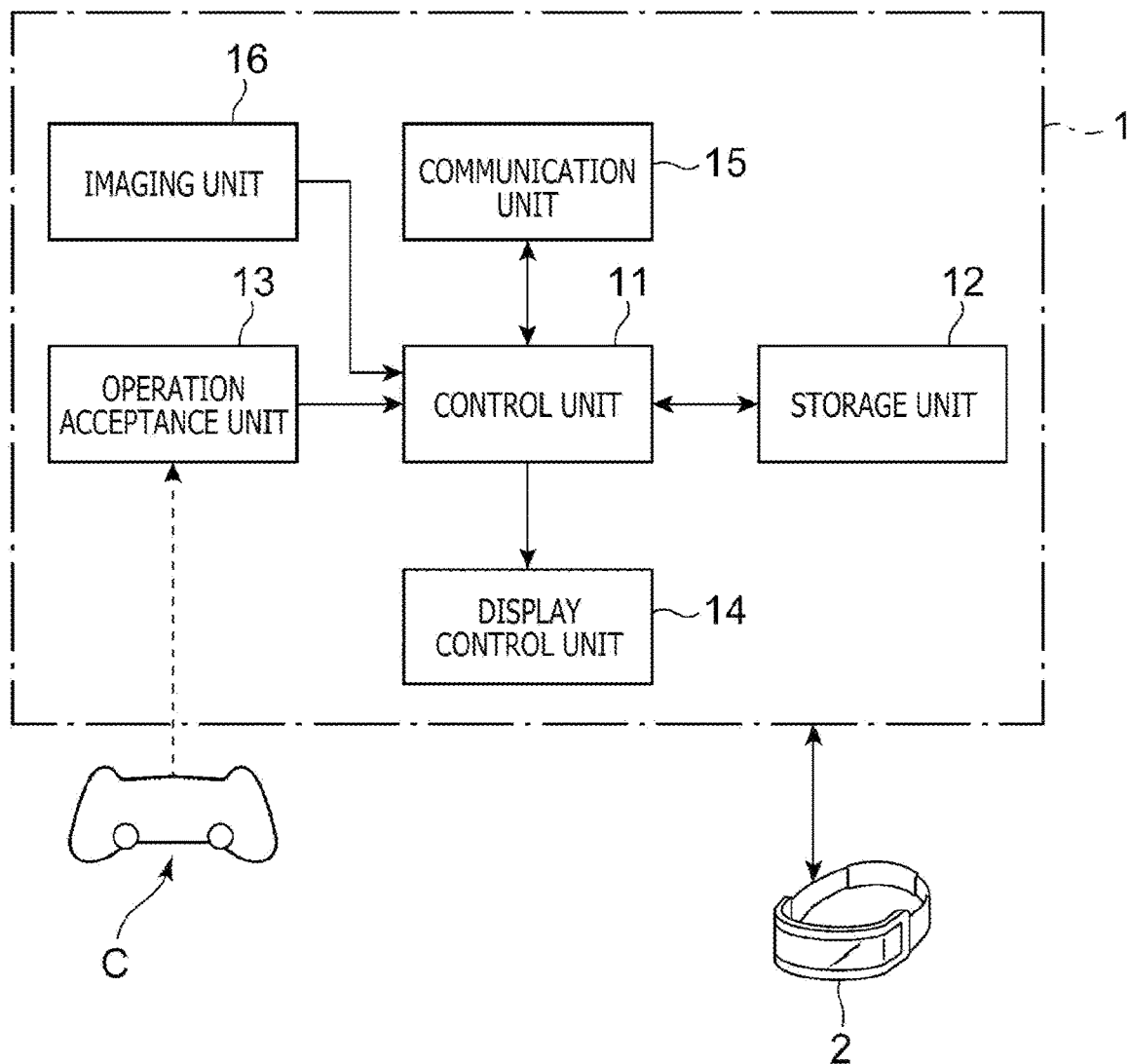
FIG. 1 is a block diagram illustrating an example configuration of an information processing apparatus according to an embodiment of the present invention.

An embodiment of the present invention will be described below with reference to the accompanying drawings. An information processing apparatus 1 according to the embodiment of the present invention is, for example, a home game machine, and includes a control unit 11, a storage unit 12, an operation acceptance unit 13, a display control unit 14, a communication unit 15, and an imaging unit 16 as illustrated in FIG. 1. In addition, the information processing apparatus 1 is connected to a display apparatus 2, such as an HMD (Head-mounted Display), which a user wears on a head portion so as to be capable of communicating therewith.

Figure 2:
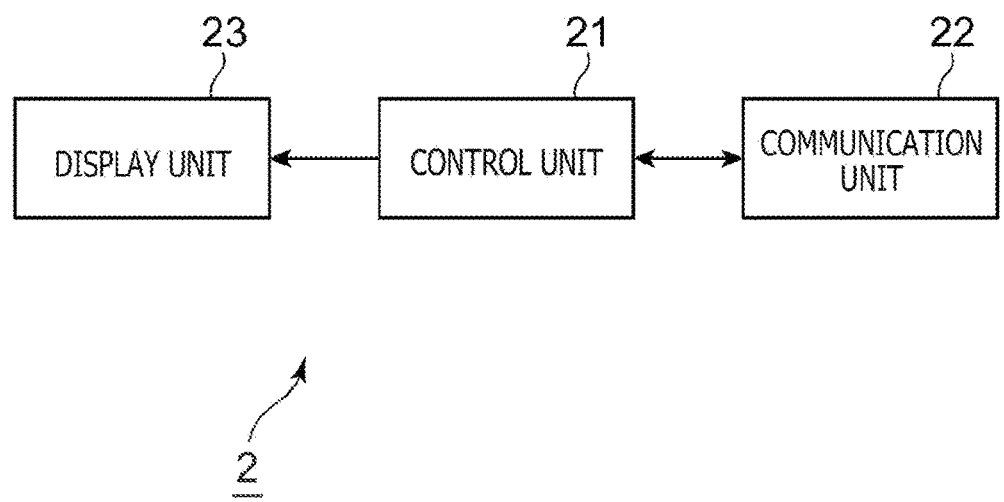
FIG. 2 is a configuration block diagram illustrating an example of a display apparatus connected to the information processing apparatus according to the embodiment of the present invention.

An example of the display apparatus 2 which the user wears on the head portion in the present embodiment is a display device that is worn on the head portion and used by the user, and includes a control unit 21, a communication unit 22, and a display unit 23 as illustrated in FIG. 2. In this example, the control unit 21 of the display apparatus 2 is a program control device, such as a microcomputer, and operates in accordance with a program stored in a memory not illustrated or the like, such as a built-in storage unit, to cause a video that matches information inputted from the information processing apparatus 1 via the communication unit 22 to be displayed on the display unit 23 to be viewed by the user. The communication unit 22 is connected to the information processing apparatus 1 in a wired or wireless manner so as to be capable of communicating therewith. The communication unit 22 outputs, to the control unit 21, information transmitted from the information processing apparatus 1 to the display apparatus 2. It is assumed that the display unit 23 displays videos for right and left eyes of the user in front of the respective eyes. The display unit 23 includes a display device, such as an organic EL (Electroluminescence) display panel or a liquid crystal display panel. The display device displays the videos in accordance with an instruction inputted from the control unit 21. The display device may be a single display device that displays the video for the left eye and the video for the right eye side by side, or may be made up of a pair of display devices that independently display the video for the left eye and the video for the right eye, respectively. Note that, in the present embodiment, the display apparatus 2 is a nontransparent display apparatus with which the user cannot see how the outside world is.

Meanwhile, the control unit 11 of the information processing apparatus 1 is a program control device, such as a CPU (Central Processing Unit), and executes a program stored in the storage unit 12. In the present embodiment, the control unit 11 acquires character body size data representing the body size of a virtual character represented by a bone model including a plurality of nodes, and, further, estimates the positions in a real space of a plurality of portions of a body of the user, the portions corresponding to nodes of the virtual character. In addition, the control unit 11 acquires user body size data representing the body size of the user, and computes a scaling coefficient on the basis of the ratio between the user body size data and the character body size data.

The control unit 11 then determines the positions in a virtual space of at least some of the nodes included in the bone model of the virtual character by using the scaling coefficient and the estimated positions in the real space of the portions of the body of the user, generates an image as viewed from a virtual camera placed at a predetermined portion of the virtual character, and causes the display apparatus worn on the head portion of the user to present the generated image. An operation of the control unit 11 will be described in detail below.

The storage unit 12 is a disk device, a memory device such as a RAM (Random Access Memory), or the like, and stores the program executed by the control unit 11. In addition, the storage unit 12 operates also as a working memory for the control unit 11, and stores data used by the control unit 11 in the process of executing the program. This program may be a program formerly stored in a computer-readable and nontemporary recording medium and thus provided, and now stored in the storage unit 12.

The operation acceptance unit 13 accepts an instructing operation of the user from an operation device C in a wired or wireless manner. Here, the operation device C is, for example, a controller of the home game machine or the like. The operation acceptance unit 13 outputs, to the control unit 11, information representing the contents of the instructing operation performed by the user on the operation device C.

The display control unit 14 sends image data inputted from the control unit 11 to the display apparatus 2 via the communication unit 15. In addition, the display control unit 14 may be connected to a display or the like, and in this case, the display control unit 14 causes the display to display an image from the point of view of the user wearing the display apparatus 2, in addition to sending the image data to the display apparatus 2.

The communication unit 15 is connected to the display apparatus 2 of the user in a wired or wireless manner so as to be capable of communicating therewith. The communication unit 15 accepts information including the image data to be transmitted to the display apparatus 2 from the display control unit 14, and outputs the information to the display apparatus 2.

The imaging unit 16 is, for example, a stereo camera or the like, and may be formed by a plurality of cameras placed at positions apart from each other, and each having an angle of view and a direction of photographing determined so as to photograph the user. The imaging unit 16 repeatedly captures images of the user in the real space, and sends image data obtained by the capturing to the control unit 11.

Figure 3:
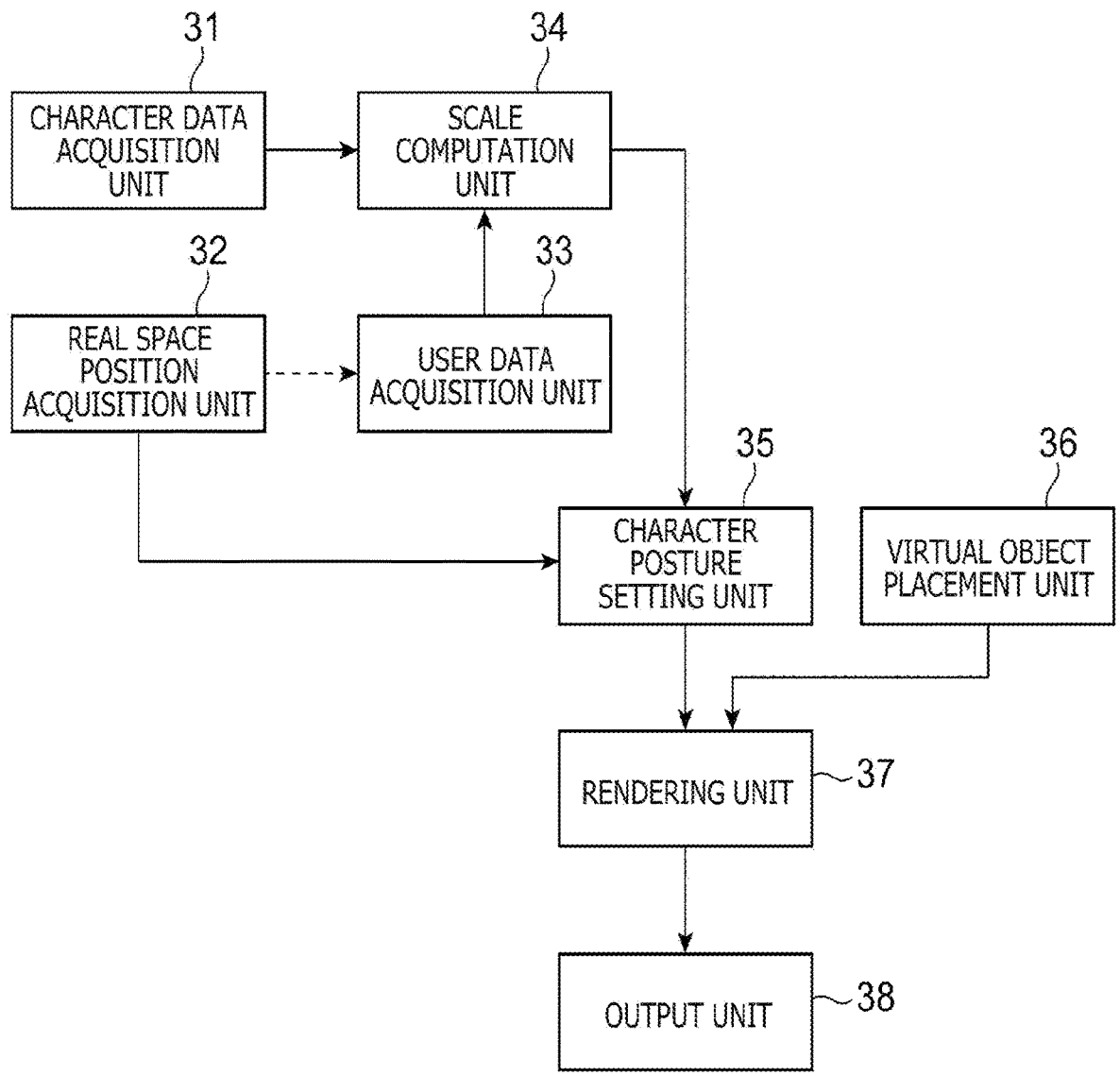
FIG. 3 is a functional block diagram illustrating an example of the information processing apparatus according to the embodiment of the present invention.

Here, an operation of the control unit 11 of the information processing apparatus 1 will now be described below. As illustrated in FIG. 3, the control unit 11 according to the present embodiment, for example, includes a character data acquisition unit 31, a real space position acquisition unit 32, a user data acquisition unit 33, a scale computation unit 34, a character posture setting unit 35, a virtual object placement unit 36, a rendering unit 37, and an output unit 38 as functional blocks.

Figure 4:
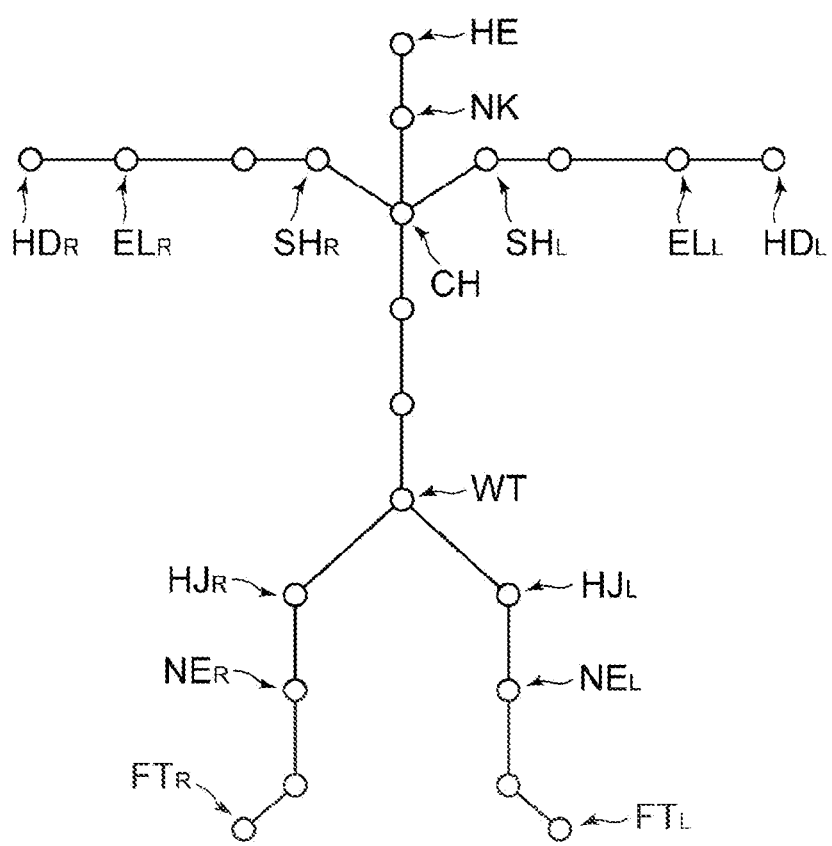
FIG. 4 is an explanatory diagram illustrating an example of a bone model used by the information processing apparatus according to the embodiment of the present invention.

As means for acquiring the character body size data, the character data acquisition unit 31 accepts, from the user, a selection of a virtual character represented by a bone model including a plurality of nodes, and acquires the character body size data representing the body size of the selected virtual character. Here, as illustrated in FIG. 4, the bone model, for example, includes a plurality of nodes and bones each connecting a pair of nodes, and it is assumed that the nodes are placed at positions corresponding to various portions of the virtual character, including a chest portion CH, a neck portion NK, a head portion HE, shoulder portions SH, arm joint portions EL, hand joint portions (distal arm ends) HD, a waist portion WT, hip joint portions HJ, knee portions NE, foot portions FT, and so on. Note that the bone model illustrated in FIG. 4 is an example, and that various bone models widely known can be adopted in the present embodiment.

The character data acquisition unit 31 according to the present embodiment acquires the bone model of the virtual character determined previously, information defining the external appearance thereof (e.g., a polygon model, a texture, etc.), and character body size data Hc representing the body size thereof. Here, the character body size data Hc is expressed as a difference, e.g., HEh−FTh, between the height of the node of the virtual character in the bone model that is closest to a floor, e.g., the height FTh of the node of the foot portion FT, and the height of the node that is farthest from the floor, e.g., the height HEh of the node of the head portion HE, (Hc=HEh−FTh).

Here, the height is expressed as follows. That is, a direction perpendicular to a floor in the virtual space on which the virtual character stands (i.e., a direction of a line segment corresponding to an intersection of a coronal plane and a sagittal plane when the character stands upright on the floor) is defined as a z-axis, and the upward direction from the floor is defined as a positive direction thereof. In addition, assuming that the floor in the virtual space is a plane z=0, an axis parallel to the floor and extending in the front-rear direction of the virtual character when the character is in an initial state (i.e., a state prior to any body movement) (i.e., a direction of a line segment corresponding to an intersection of a transverse plane and the sagittal plane) is defined as a y-axis, and an axis parallel to the floor and extending in the left-right direction of the virtual character in the initial state (i.e., a direction of a line segment corresponding to an intersection of the transverse plane and the coronal plane) is defined as an x-axis. In addition, the forward direction for the virtual character in the initial state is defined as a positive direction along the y-axis, and the rightward direction for the character in the initial state is defined as a positive direction along the x-axis. It is assumed that the direction of each axis of the xyz coordinate system (i.e., a world coordinate system for the virtual space) does not change even if the character moves thereafter.

Then, in this case, a value of the height of each portion of the virtual character means a value of a z-coordinate of the corresponding node when the position of the node is expressed using the xyz coordinate system.

Note that, although it has been assumed here that the character data acquisition unit 31 acquires the information including the bone model concerning the virtual character determined previously, in an example of the present embodiment, bone models, information defining the external appearance, and character body size data Hc concerning a plurality of virtual characters may be stored in the storage unit 12 of the information processing apparatus 1. In this case, if the user selects one of the virtual characters, the character data acquisition unit 31 acquires the bone model, the information defining the external appearance, and the character body size data Hc concerning the selected virtual character. Also note that such data concerning the virtual characters may be acquired via a network.

The real space position acquisition unit 32 realizes an example of means for acquiring the user body size data, and estimates the positions in the real space of a plurality of portions of the body of the user which correspond to at least some of the nodes of the bone model of the virtual character acquired by the character data acquisition unit 31.

It is assumed in an example of the present embodiment that the positions in the real space of the head portion (i.e., a center of a rectangular parallelepiped circumscribing the head portion; the same applies hereinafter), a chest portion, distal ends of left and right arms (i.e., left and right hands), a waist portion, and left and right feet (i.e., distal ends of legs) of the user are detected. In addition, in an example of the present embodiment, the real space position acquisition unit 32 realizes an example of the means for acquiring the user body size data, and acquires information representing the positions of the aforementioned portions of the user from an image of the user in the real space captured by the imaging unit 16, which is a stereo camera. Here, the information representing the position of each portion of the user in the real space can be determined as values of coordinates in a world coordinate system (hereinafter referred to as a orthogonal coordinate system) for the real space with a predetermined reference point in the real space as an origin.

Here, the reference point of the world coordinate system may be set at a predetermined position on a floor on which the user stands, and because a method for estimating and acquiring coordinates of the position of each portion of the user as values in such a world coordinate system on the basis of an image of the user captured by a stereo camera is widely known, a detailed explanation thereof is omitted here.

Note that, although it is assumed in this example that the positions of the portions of the body of the user are detected on the basis of the image captured by the stereo camera, the present embodiment is not limited to this example, and that any other method may be adopted as long as the coordinates of the position of each portion of the user in the real space can be acquired, examples of such other methods including a method in which a tracker device autonomously estimates the position by applying a SLAM (Simultaneous Localization and Mapping) technique, or a tracker that estimates the position of each portion of the body of the user with a laser or the like emitted from a tracker device or the like, and methods employing magnetism, an IMU (Inertial Measurement Unit), a GPS (Global Positioning System), or an RF (Radio Frequency) tag. Therefore, the imaging unit 16 may not be necessary depending on the method adopted.

As the means for acquiring the user body size data, the user data acquisition unit 33 acquires user body size data Hu representing the body size of the user. Specifically, the user body size data Hu represents a difference between the height of the head portion of the user and the height of the feet of the user when the user stands upright on the floor. Here, the height of each portion is a value measured in a direction of the stature of the user, and, specifically, is expressed by a value of a $\zeta$-axis component of coordinate values of the portion in the world coordinate system.

In addition, in the present embodiment, the information processing apparatus 1 may request the user to stay still in an upright pose for a while, acquire the position of the head portion of the user and the position of the foot of the user in this state, and obtain the user body size data Hu from information as to these positions. Meanwhile, the user data acquisition unit 33 may repeatedly acquire values (i.e., differences between the aforementioned heights) corresponding to the user body size data Hu for a predetermined time, and use the greatest value among the acquired values as the user body size data Hu. This may eliminate the need to request the user to assume a pose.

Note that, here, regarding the position of the foot of the user, the position of an actual foot of the user may be estimated on the basis of an image obtained by the imaging unit 16, or the position of the floor, instead of the position of an actual foot, may be used as the position of the foot.

Furthermore, although it has been assumed in this example that the position of the head portion and the position of the foot of the user are acquired, the user body size data Hu may not necessarily represent a length corresponding to the stature. For example, a maximum distance between both hands (i.e., a distance between both hands with arms outstretched), which is statistically known to be substantially equal to the stature in the case of humans, may be used. In this case, the information processing apparatus 1 instructs the user to assume a pose in which the arms are outstretched, estimates the positions in the real space of the left and right hands of the user in this pose, and computes the distance between the positions of the hands, thereby obtaining the user body size Hu. In addition, the user data acquisition unit 33 may repeatedly acquire values (i.e., aforementioned distances between both hands) corresponding to the user body size data Hu for a predetermined time, and use the greatest value among the acquired values as the user body size data Hu.

Note that, in the case where the maximum distance between both hands of the user is used as the user body size data Hu, a maximum distance between both hands of the character (i.e., a distance between both hands when the character has outstretched both arms) may be used as the character body size data Hc.

Furthermore, although it has been assumed here that the user data acquisition unit 33 acquires the user body size data Hu on the basis of an actual image of the user acquired by the real space position acquisition unit 32, the present embodiment is not limited to this example, and the user data acquisition unit 33 may accept, as numerical value information, an input of the stature of the user via a user operation, and use this information as the user body size data Hu.

As scale computation means, the scale computation unit 34 computes a scaling coefficient Sr on the basis of the ratio of the character body size data Hc to the user body size data Hu, i.e., Hc/Hu. It is assumed here that the scale computation unit 34 determines this ratio itself to be the scaling coefficient Sr. That is, it is assumed that Sr=Hc/Hu.

As character posture estimation means, the character posture setting unit 35 determines the positions in the virtual space of the nodes included in the bone model of the virtual character, using the scaling coefficient and the estimated positions in the real space of the portions of the body of the user. In an example of the present embodiment, the character posture setting unit 35 does not necessarily need to determine the coordinates of the positions in the virtual space of all the aforementioned nodes of the virtual character by using the scaling coefficient and the positions in the real space of the portions of the body of the user, and may determine the positions in the virtual space of selected nodes selected in advance out of the nodes included in the bone model of the virtual character by using the scaling coefficient and the estimated positions in the real space of the portions of the body of the user, and then determine the position of each of the nodes other than the selected nodes included in the bone model of the virtual character on the basis of the determined positions in the virtual space of the selected nodes.

It is assumed in this example of the present embodiment that the nodes of those portions of the virtual character which correspond to the portions of the body of the user acquired by the real space position acquisition unit 32 are the selected nodes. In the case where the real space position acquisition unit 32 acquires the positions in the real space of the head portion, the chest portion, the distal ends of the left and right arms (i.e., the left and right hands), the waist portion, and the left and right feet (i.e., the distal ends of the legs) of the user, for example, the character posture setting unit 35 treats, as the selected nodes, the corresponding nodes (i.e., the nodes corresponding to the head portion, the chest portion, the distal ends of the left and right arms (i.e., the left and right hands), the waist portion, and the left and right feet) in the virtual character, and determines the positions of the selected nodes by using the scaling coefficient and the positions in the real space of the portions of the body of the user. A method for this determination will be described below.

Then, the character posture setting unit 35 determines the position of each of the nodes other than the selected nodes included in the bone model of the virtual character on the basis of the determined positions of the selected nodes. The determination of the positions of the nodes other than the selected nodes can be performed employing an inverse kinematic method widely known, such as FABRIK (Forwards and Backwards Reaching Inverse Kinematics), and therefore, a description thereof is omitted here.

Here, a method for determining the positions of the selected nodes will now be described below. In the present embodiment, the character posture setting unit 35 determines the positions of the selected nodes in the following manner. That is, in the present embodiment, assuming that the origin and scale of the world coordinate system for the real space correspond with those of the world coordinate system for the virtual space, the character posture setting unit 35 treats, as reference points, coordinates ($\xi 0$, $\eta 0$, $\zeta 0$) and (x0, y0, z0) of points in the real space and the virtual space at which perpendiculars from the positions of the head portion of the user and the head portion (i.e., the node of the head portion) of the virtual character to the floors in the real space and the virtual space, respectively, intersect with the corresponding floors, and sets ($\xi 0$, $\eta 0$, $\zeta 1$)=($\xi$HE, $\eta$HE, 0) and (x0, y0, z0)=(xHE, yHE, 0), using the coordinates ($\xi$HE, $\eta$HE, $\zeta$HE) of the head portion of the user in the real space (since the origin is set on the floor in this example as mentioned above, $\zeta$=0 and z0=0).

The character posture setting unit 35 converts the coordinate values of each of the portions of the user obtained by the real space position acquisition unit 32 to a position relative to the reference point obtained here (i.e., the reference point in the real space). For example, using the position ($\xi$H, $\eta$RH, $\zeta$RH) of the right hand of the user obtained by the real space position acquisition unit 32, the character posture setting unit 35 calculates the relative position ($\xi$rRH, $\eta$rRH, $\zeta$rRH) of the right hand of the user as follows: ($\xi$rRH, $\eta$rRH, $\zeta$rRH)=($\xi$RH−$\xi 0$, $\eta$RH−$\eta 0$, $\zeta$RH−$\zeta$). In this manner, the character posture setting unit 35 calculates the position, relative to the aforementioned reference point, of each of the head portion, the chest portion, the distal ends of the left and right arms (i.e., the left and right hands), the waist portion, and the left and right feet (i.e., the distal ends of the legs) of the user.

The character posture setting unit 35 calculates a relative position Nr of the node in the bone model of the virtual character in the virtual space, the node corresponding to each of the aforementioned portions of the user, using the scaling coefficient Sr and information Pr as to the relative position of the corresponding portion of the user in the real space, as follows: Nr=Sr×Pr. For example, coordinates (xrRH, yrRH, zrRH) of the relative position of the node of the bone model corresponding to the right hand of the virtual character in the virtual space are calculated as follows: (xrRH, yrRH, zrRH)=($\xi$rRH×Sr, $\eta$rRH×Sr, $\zeta$rRH×Sr).

The character posture setting unit 35 converts the relative position Nr of the node in the bone model of the virtual character in the virtual space, the node corresponding to each of the aforementioned portions of the user, to coordinates relative to the origin set in the virtual space, thus determining the coordinate values (x, y, z) of the selected node. That is, in the case of the above example, the coordinate values (xRH, yRH, zRH) of the node of the bone model corresponding to the right hand of the virtual character in the virtual space are calculated as follows: (xRH, yRH, zRH)=(xrRH+x0, yrRH+y0, zrRH+z0).

For every other selected node, the character posture setting unit 35 similarly calculates the position, relative to the reference point, of the corresponding portion of the user, and determines this relative position multiplied by the scaling coefficient to be the relative position of the selected node of the virtual character in the virtual space. Then, the coordinates of this selected node are determined from the relative position and the coordinates of the reference point in the virtual space.

As means for placing a virtual object, the virtual object placement unit 36 places a virtually set object in the virtual space. Here, the object to be placed in the virtual space may be an object corresponding to a real object in the real space, or may have no corresponding real object.

For example, the virtual object placement unit 36 acquires the position of a wall in the real space, and places a wall that is a virtual object at a corresponding position in the virtual space. In addition, through a process performed by a game program or the like executed by the control unit 11, the virtual object placement unit 36 places, in the virtual space, an enemy character or the like that is a virtual object and which has no corresponding real object in the real space.

In addition, the virtual object placement unit 36 transforms and displays a polygon model of the virtual character acquired by the character data acquisition unit 31 on the basis of the bone model the position of each node of which has been determined by the character posture setting unit 35. A processing method for controlling the posture of a virtual character in a virtual space by using a bone model as described above is widely known, and a description thereof is omitted here.

The rendering unit 37 generates an image in the virtual space set by the virtual object placement unit 36 through rendering. It is assumed in an example of the present embodiment that the rendering unit 37 assumes a camera for rendering to be at a predetermined portion (e.g., the position of the head portion) of the virtual character, and that this camera faces a forward side (i.e., a side on which a face lies in a direction along a normal to the coronal plane crossing the head portion) of the virtual character. It is also assumed that the angle of view thereof is determined in advance.

The rendering unit 37 generates image data of objects (including each portion of the virtual character itself) in the virtual space as viewed from the camera set as described above through rendering. A widely known method for such rendering can be adopted.

The output unit 38 sends the image data generated by the rendering unit 37 to the display apparatus 2 worn by the user.

(Operation)

The present embodiment has the above-described configuration, and an operation thereof is as follows. It is assumed in the following description that the user selects and uses a virtual character in a virtual space used in a game. It is also assumed in the following description that the world coordinate systems for the real space and the virtual space are set in the same manner as in the example already described.

Figure 5:
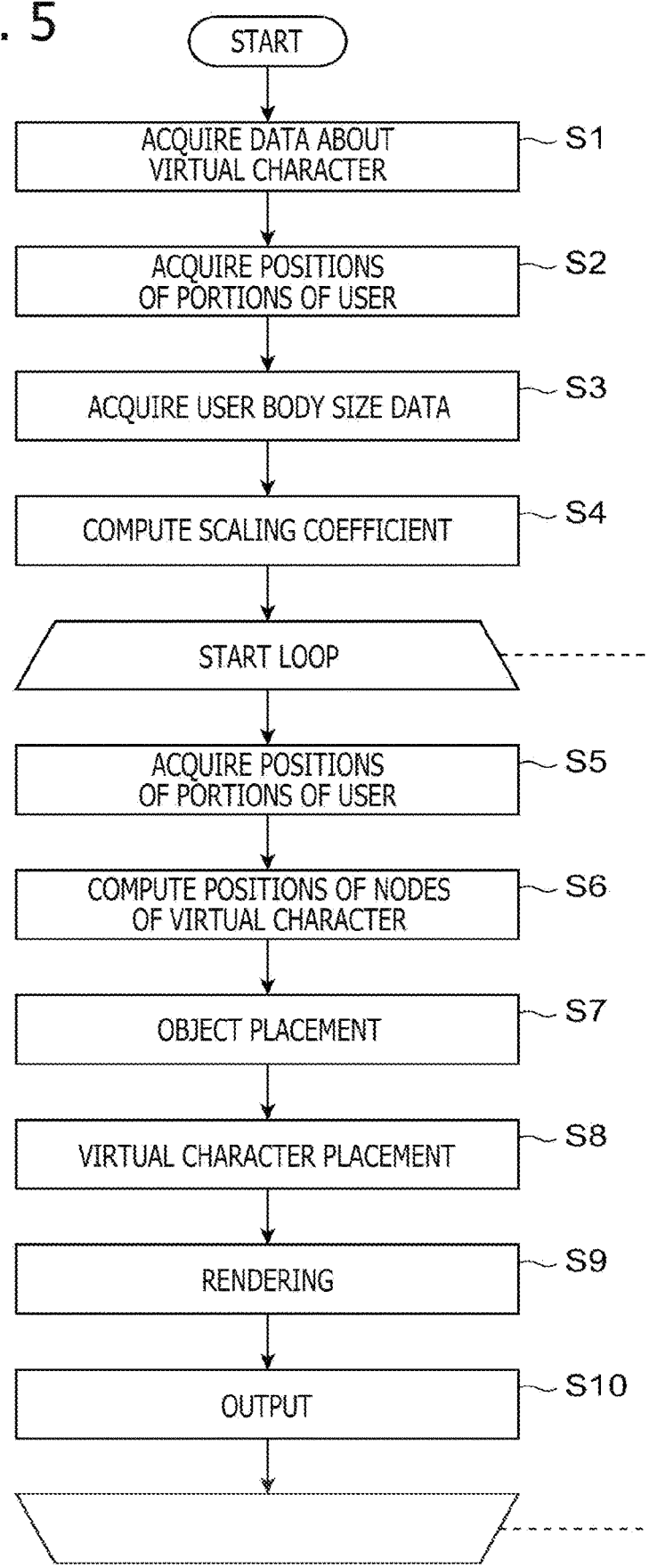
FIG. 5 is a flowchart illustrating an example operation of the information processing apparatus according to the embodiment of the present invention.

Once the user operates the information processing apparatus 1 and selects a virtual character, the information processing apparatus 1 starts a procedure illustrated in FIG. 5, and acquires a bone model of the virtual character, information defining the external appearance thereof (e.g., a polygon model, a texture, etc.), and character body size data Hc representing the body size thereof (S1).

Note that the character body size data Hc may be computed as a difference between the height FTh of the node of the foot portion FT and the height HEh of the node of the head portion HE in the bone model of the virtual character, i.e., Hc=HEh−FTh.

In addition, from the images of the user in the real space captured by the imaging unit 16, the information processing apparatus 1 repeatedly obtains values of coordinates, in the world coordinate system (referred to as the orthogonal coordinate system) for the real space, of the head portion, the chest portion, the distal ends of the left and right arms (i.e., the left and right hands), the waist portion, and the left and right feet (i.e., the distal ends of the legs) of the user a plurality of times at predetermined timings (S2).

In addition, the information processing apparatus 1 acquires the user body size data Hu representing the body size of the user (S3). Specifically, the user body size data Hu may be obtained from the difference between the height of the head portion of the user and the height of the feet of the user when the user stands upright on the floor. As described already, for example, the information processing apparatus 1 may repeatedly acquire values (i.e., differences between the aforementioned heights) corresponding to the user body size data Hu for a predetermined time, and use the greatest value among the acquired values as the user body size data Hu.

The information processing apparatus 1 obtains the ratio, Hc/Hu, of the character body size data Hc to the user body size data Hu as the scaling coefficient Sr (Sr=Hc/Hu) (S4).

Then, the information processing apparatus 1 starts a repetitive procedure (Start Loop), and obtains, from an image of the user in the real space captured by the imaging unit 16, values of coordinates, in the world coordinate system (referred to as the orthogonal coordinate system) for the real space, of the head portion, the chest portion, the distal ends of the left and right arms (i.e., the left and right hands), the waist portion, and the left and right feet (i.e., the distal ends of the legs) of the user (S5).

Then, the information processing apparatus 1 determines the positions in the virtual space of the nodes included in the bone model of the virtual character, using the positions in the real space of the portions of the body of the user estimated at step S5, and the scaling coefficient Sr obtained at step S4 (S6).

Specifically, the information processing apparatus 1 determines those nodes of the bone model of the virtual character which correspond to the portions of the user the positions in the real space of which have been acquired at step S5 to be the selected nodes. Then, the information processing apparatus 1 obtains coordinates, $(\xi 0, \eta 0, \zeta 1)=(\xi HE, \eta HE, 0)$, of a point in the real space at which a perpendicular from the position of the head portion of the user obtained at step S5 to the floor intersects with the floor, and coordinates, $(x0, y0, z0)=(xHE, yHE, 0)$, of a point in the virtual space at which a perpendicular from the node of the head portion of the virtual character to the floor intersects with the floor, and determines these points to be the respective reference points in the real space and the virtual space.

The information processing apparatus 1 converts the coordinate values of the portions of the user obtained at step S5 to positions relative to the reference point (i.e., the reference point in the real space) obtained here. In addition, the information processing apparatus 1 calculates the relative position Nr of the node in the bone model of the virtual character in the virtual space, the node corresponding to each of the aforementioned portions of the user, using the scaling coefficient Sr and the information Pr as to the relative position of the corresponding portion of the user in the real space, as follows: Nr=Sr×Pr. Then, the information processing apparatus 1 converts the relative position Nr (i.e., values in a coordinate system with the reference point as the origin) of the node in the bone model of the virtual character in the virtual space, the node corresponding to each of the aforementioned portions of the user, to values of coordinates relative to the origin set in the virtual space, thus determining the coordinate values (x, y, z) of each of the selected nodes.

In addition, the information processing apparatus 1 determines the position of each of the nodes other than the selected nodes included in the bone model of the virtual character on the basis of the determined positions of the selected nodes. It is assumed that this determination of the positions of the nodes other than the selected nodes is performed employing an inverse kinematic method widely known, such as FABRIK.

The information processing apparatus 1 further acquires the position of a wall in the real space, and places a wall that is a virtual object at a corresponding position in the virtual space. In addition, through a process performed by a game program or the like being executed, the information processing apparatus 1 places an enemy character or the like that is a virtual object at a position in the virtual space specified by the game program (S7: Object Placement).

Then, the information processing apparatus 1 transforms and displays the polygon model of the virtual character on the basis of the bone model the position of each node of which has been determined at steps S5 and S6 (S8: Virtual Character Placement).

The information processing apparatus 1 renders an image in the virtual space set at steps S7 and S8 as data of an image as viewed from the virtual camera placed at a predetermined portion (e.g., the position of the head portion) of the virtual character (S9). Note that the direction and angle of view of the camera are set in a predetermined range on the forward side of the virtual character. The information processing apparatus 1 sends the image data rendered here to the display apparatus 2 worn on the head portion of the user, thus presenting the image data to the user (S10).

The information processing apparatus 1 performs these steps S5 to S10 repeatedly during execution of the game program. Thus, data of images in the virtual space as viewed from the point of view of the virtual character is provided to the user, and if the user changes his or her pose, the pose of the virtual character is set according to the change of the pose.

At this time, if the virtual character has a stature lower than the stature of the user, the user can see an image in the virtual space from a point of view at the lower stature. In addition, in the present embodiment, the positions in the virtual space of the nodes included in the bone model of the virtual character are determined using the estimated positions in the real space of the portions of the body of the user, and the scaling coefficient Sr related to the ratio of body sizes, e.g., statures, lengths of arms, etc., and therefore, the display positions of the hands and feet of the character as viewed from the head portion of the character correspond with the positions of the hands and feet of the user as viewed from the user in the real space (i.e., the angles from the points of view). Furthermore, in the present embodiment, the positions of the nodes of the portions of the character are determined using computation employing the inverse kinematic method based on the positions of some of the nodes of the character thus determined, and therefore, the positions of the portions other than the hands and feet, such as joints, as viewed from the head portion of the character also substantially correspond with the positions of corresponding portions, such as joints, of the user as viewed from the user in the real space (i.e., the angles). The information processing apparatus 1 according to the present embodiment as described above is able to provide a display that does not cause an uncomfortable feeling, regardless of the scale of the ratio between the size of the real body of the user and the size of the body of the character, leading to an enhanced sense of immersion into the character.

(Movement of User)

In the case where the user is permitted to move while wearing the display apparatus 2, using an amount of movement in the virtual space that matches an amount of movement of the user in the real space as it is (i.e., without taking the scaling coefficient into account) for the stature as recognized by the user in the virtual space would cause a feeling that the amount of movement for the stature is excessive. Moreover, in the above-described example of the present embodiment, detection results of the positions of the feet after a movement would not match the amount of the movement in the real space.

Accordingly, in the present embodiment, in the case where a target object, such as a wall, in the real space is displayed as a virtual object at a corresponding position in the virtual space on the basis of information as to the position thereof in the real space, the display position of the object may be determined in the following manner.

Also in the case where the user moves as described above, the information processing apparatus 1 performs the procedure as illustrated in FIG. 5, but, when setting the reference point in the real space and the reference point in the virtual space at step S7, determines a foot of a perpendicular from the head portion of the user at the time of this step (i.e., after a movement) to the floor to be the reference point in the real space, and determines a foot of a perpendicular from the node of the head portion of the bone model of the virtual character to the floor in the virtual space to be the reference point in the virtual space.

Then, the information processing apparatus 1 further acquires the position of the target object, such as the wall, in the real space. For example, the information processing apparatus 1 acquires coordinates of at least three vertices of a rectangular parallelepiped circumscribing the target object in the real space. Then, the information processing apparatus 1 converts the coordinates of these vertices to coordinates relative to the reference point in the real space, and multiplies values of the relative coordinates by the scaling coefficient, thus obtaining coordinates relative to the reference point in the virtual space. The information processing apparatus 1 converts the obtained relative coordinates of the vertices to coordinates relative to the origin in the virtual space, and, assuming that corresponding vertices are at the converted coordinates in the virtual space, places a virtual object corresponding to the target object in the real space (i.e., sets the form of a polygon of the virtual object, the position thereof, etc.).

As described above, in an example of the present embodiment, when a virtual object corresponding to a target object is placed at a position in the virtual space which is determined on the basis of information as to the position of the target object in the real space, the position at which the virtual object is to be placed in the virtual space is determined using the scaling coefficient and the information as to the position of the target object in the real space.

In this example, when the stature of the virtual character is lower than the stature of the actual user (i.e., when the scaling coefficient is smaller than "1"), the distance between the virtual character and the wall, for example, is reduced by the rate of the scaling coefficient compared to the distance between the actual user and the wall, and is made shorter according to the step (which is assumed to be proportional to the stature) of the virtual character. Thus, when the user has moved up to a position at which the user can touch the wall, data of an image as viewed from the virtual character will represent the virtual character having moved up to a position at which the virtual character can touch the wall, resulting in a reduction in an uncomfortable feeling.

Note that the length of the arms of the user does not change in reality, and therefore, when the relative coordinates of the virtual object in the virtual space are computed, the coordinates relative to the reference point in the virtual space may be determined by subtracting a value corresponding to the length of the arms of the user from each of values of $\xi$-axis and $\eta$-axis components of the relative coordinate values in the real space, then multiplying the resultants by the scaling coefficient, and then adding the above value corresponding to the length of the arms to the resultants.

In this example, when dw denotes the distance from the user to the wall in the real space, and la denotes the length of the arms, for example, the distance dw' between the wall and the virtual character in the virtual space is computed as follows:

dw'=Sr×(dw−Sr×la)+Sr×la.

Here, the length of the arms of the user may be specified by the user, or the length of the arms of the user in the real space may be estimated on the basis of information as to the positions in the real space of a plurality of portions of the body of the user. The length estimated here may be, for example, the length of arms of an average person with the estimated stature, or the greatest value of distances from the chest portion to the distal end of the arm detected repeatedly at step S2 in FIG. 5 may be used as in the estimation of the stature.

(Viewing Angle)

Further, when the data of the image as viewed from the virtual camera placed at the predetermined portion of the virtual character is rendered, the control unit 11 according to the present embodiment may determine the angle of view of the camera by using information as to a length Wc of an arm of the bone model of the virtual character.

Here, the length Wc of the arm of the bone model is defined as the shortest distance between the node of the distal end of an arm portion and a perpendicular L from the node of the head portion HE to the floor (i.e., a distance from the node of the distal end of the arm portion to a foot of a perpendicular therefrom to the perpendicular L) when the bone model is set in an upright state on the floor with the arms fully outstretched (i.e., in a state of what is generally called a T-pose).

The control unit 11 implements a function related to an example of the means for acquiring the user body size data, and acquires information as to a length Wu of an arm of the user (i.e., the length of the arm in the real space) in advance. The length Wu of the arm of the user may also be specified by the user, or the length of the arm of the user in the real space may be estimated on the basis of the information as to the positions in the real space of a plurality of portions of the body of the user. That is, as in the case described above, the length may be the length of arms of an average person with the estimated stature, or the greatest value of the distances from the chest portion to the distal end of the arm detected repeatedly at step S2 in FIG. 5 may be used as in the estimation of the stature.

Figure 6:
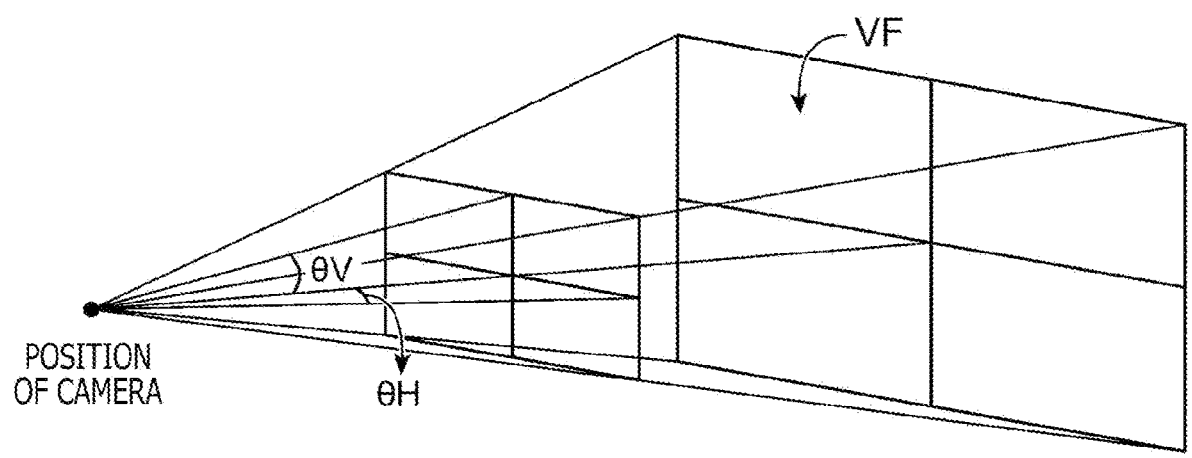
FIG. 6 is an explanatory diagram illustrating an example of an angle of view set by the information processing apparatus according to the embodiment of the present invention.

Then, when the image in the virtual space is rendered, the control unit 11 determines the angle of view of the virtual camera for rendering in the following manner. It is assumed here that the angle of view determined in advance is denoted as θ. As illustrated in FIG. 6, this angle of view means a range captured by the camera (i.e., vertex angles of what is generally called a viewing frustum VF, including a vertical angle of view, θV, and a horizontal angle of view, θH), and default angles of view (a default vertical angle of view and a default horizontal angle of view are denoted as θV0 and θH0, respectively) are determined in advance.

The control unit 11 determines the angles of view, θH and θV, as follows when the data of the image in the virtual space as viewed from the point of view (i.e., the head portion) of the virtual character is rendered.

$$\theta_V = 2\tan^{-1}\left(\frac{W_c}{H_c} \cdot \tan(\theta_{V0}/2)\right)$$ [Math. 1]

$$\theta_H = 2\tan^{-1}\left(\frac{W_c}{H_c} \cdot \tan(\theta_{H0}/2)\right)$$

Or $$\theta_V = 2\tan^{-1}\left(\frac{W_c}{H_c} \cdot \frac{H_u}{W_u} \cdot \tan(\theta_{V0}/2)\right)$$ [Math. 2]

$$\theta_H = 2\tan^{-1}\left(\frac{W_c}{H_c} \cdot \frac{H_u}{W_u} \cdot \tan(\theta_{H0}/2)\right)$$

In these examples, the angles of view are controlled on the basis of the length of the arms of the virtual character, more specifically, according to the ratio of the length of the arms of the virtual character to the stature of the virtual character, or a value obtained by multiplying this ratio by the ratio of the stature of the user to the length of the arms of the user.

Note that, in the case where the left and right arms of the virtual character have different lengths, the length of the longer arm or the length of the shorter arm may be used as the length Wc of the arm of the virtual character.

In addition, the default angles of view may be used as the angles of view (i.e., θV=θV0, θH=θH0) in the case where the ratio between the stature and the length of the arm is the same for both the virtual character and a human, such as when the virtual character is a human-shaped character.

Meanwhile, in the case where it cannot be assumed that the length of the arm changes in proportion to the stature (e.g., in the case where the character is a robot having extremely short arms, a dragon having extremely long arms, or the like), the angles of view are set on the basis of the length of the arm, so that the data of the image in the virtual space will be rendered with a field of view specific to the virtual character (e.g., an extremely narrow field of view, or an extremely wide field of view). This makes it possible to provide a display that does not cause an uncomfortable feeling, leading to an enhanced sense of immersion into the character.

(Adjustment of Bone Model)

The information processing apparatus 1 according to the present embodiment may further change the ratio of the length of the arms to the stature of the bone model of the virtual character to be used, thereby controlling the display positions of the hands and feet of the character as viewed from the head portion of the character to correspond with the positions of the hands and feet of the user as viewed by the user in the real space (i.e., the angles from the points of view).

Specifically, in the case where the bone model is defined by the coordinate values of the nodes in the state of the T-pose, the information processing apparatus 1 duplicates the bone model to be used, and further corrects the coordinate values of the nodes of the bone model in a manner described below, thereby generating a corrected bone model.

That is, in the case where the coordinate values of the nodes in an initial state of the T-pose are defined as values when a central axis of a body (or a trunk) coincides with the z-axis (i.e., the central axis lies on a straight line x=y=0), and the arms in the T-pose extend in a direction parallel to the x-axis, the x-coordinate value x of the coordinates (x, y) of each of nodes (i.e., nodes corresponding to elbows, wrists, fingers, etc.) that belong to the arms is multiplied by a predetermined correction coefficient.

Here, the correction coefficient may be the ratio of the stature Hc of the virtual character to the length Wc of both arms of the virtual character (i.e., the distance between the distal ends of both arms when the virtual character is in the T-pose with both arms fully stretched to the left and the right), Hc/Wc (a value when it is assumed that the stature and the length of both arms of the user are equal to each other), or a value obtained by multiplying the above ratio by the ratio of the length Wu of both arms to the stature Hu of the user (each of which is acquired as the user body size data), (Hc/Wc)×(Wu/Hu).

Then, the information processing apparatus 1 draws the character by using the corrected bone model as corrected. In this case, the ratio of the length of both arms to the stature of the character is corrected using a value obtained with the ratio between the stature and the length of both arms of the user or the like taken into account, and therefore, regardless of the scale of the ratio between the size of the real body of the user and the size of the body of the character, a display that does not cause an uncomfortable feeling can be provided, leading to an enhanced sense of immersion into the character.

(Another Example of Display)

Note that, although it has been assumed in the foregoing description of the present embodiment that the information processing apparatus 1 generates images to be displayed by a device, such as an HMD, worn on the head portion of the user, the present embodiment is not limited to this example, and is applicable also in the case where an image to be displayed from a first-person point of view is displayed on a general display device such as a household television. In this case, the display apparatus 2 and the process of providing an output thereto may not be necessary.

REFERENCE SIGNS LIST

1: Information processing apparatus
2: Display apparatus
11: Control unit
12: Storage unit
13: Operation acceptance unit
14: Display control unit
15: Communication unit
16: Imaging unit
21: Control unit
22: Communication unit
23: Display unit
31: Character data acquisition unit
32: Real space position acquisition unit
33: User data acquisition unit
34: Scale computation unit
35: Character posture setting unit
36: Virtual object placement unit
37: Rendering unit
38: Output unit

The invention claimed is:

1. An information processing apparatus that generates an image in a virtual space to be presented to a user, the information processing apparatus comprising:
   a detector operating to detect information as to a position of a target object in a real space;
   a processor operating to place a virtual object corresponding to the target object at a position in the virtual space obtained on a basis of the detected information as to the position of the target object in the real space;
   a detector operating to acquire user body size data representing a size of a body of the user in the real space;
   a processor operating to acquire character body size data representing a body size of a virtual character represented by a bone model including a plurality of nodes;
   a processor operating to determine the position in the virtual space at which the virtual object is to be placed, using the detected information as to the position of the target object in the real space, and the user body size data about the user in the real space; and
   a computation circuit operating to compute a scaling coefficient on a basis of a ratio between the user body size data and the character body size data,
   wherein the processor operates to determine the position in the virtual space at which the virtual object is to be placed determines this position by using the detected information as to the position of the target object in the real space, the scaling coefficient, and the user body size data in the real space.

2. The information processing apparatus according to claim 1, wherein
   the information processing apparatus is connected to a display apparatus that is worn on a head portion of the user and presents an image in the virtual space to the user,
   the detector operating to acquire the user body size data estimates positions in the real space of a plurality of portions of the body of the user, the plurality of portions corresponding to nodes of the virtual character, and acquires the user body size data on a basis of information as to the estimated positions in the real space of the plurality of portions of the body of the user,
   the information processing apparatus further includes a character posture estimation circuit operating to determine positions in the virtual space of at least some of the nodes included in the bone model of the virtual character, using the scaling coefficient and the estimated positions in the real space of the portions of the body of the user, and
   an image as viewed from a virtual camera placed at a predetermined portion of the virtual character is generated, and the display apparatus worn on the head portion of the user is caused to present the generated image.

3. The information processing apparatus according to claim 2, wherein the character posture estimation circuit determines positions in the virtual space of selected nodes selected in advance out of the nodes included in the bone model of the virtual character, using the scaling coefficient and the estimated positions in the real space of the portions of the body of the user, and determines a position of each of the nodes other than the selected nodes included in the bone model of the virtual character on a basis of the determined positions in the virtual space of the selected nodes.

4. The information processing apparatus according to claim 2, wherein when the image as viewed from the virtual camera placed at the predetermined portion of the virtual character is generated, an angle of view of the camera is determined using information as to a length of an arm of the bone model of the virtual character.

5. The information processing apparatus according to claim 1, wherein the detector operating to acquire the user body size data estimates positions in the real space of a position of the head portion of the user and a position of a foot of the user, obtains a dimension of the user in a stature direction on a basis of the position of the head portion of the user and the position of the foot of the user, and acquires the user body size data on a basis of the dimension in the stature direction.

6. The information processing apparatus according to claim 5, wherein when the position of the foot of the user is estimated, a position of a floor is estimated, and the position of the foot of the user is estimated using information as to the estimated position of the floor.

7. The information processing apparatus according to claim 1, wherein the detector operating to acquire the user body size data estimates positions in the real space of positions of left and right hands of the user, and acquires the user body size data on a basis of the positions of the left and right hands of the user.

8. An information processing method that involves use of an information processing apparatus that generates an image in a virtual space to be presented to a user, the information processing method comprising:
- detecting information as to a position of a target object in a real space;
- placing a virtual object corresponding to the target object at a position in the virtual space obtained on a basis of the detected information as to the position of the target object in the real space;
- acquiring user body size data representing a size of a body of the user in the real space;
- acquiring character body size data representing a body size of a virtual character represented by a bone model including a plurality of nodes;
- determining the position in the virtual space at which the virtual object is to be placed, using the detected information as to the position of the target object in the real space, and the user body size data about the user in the real space;
- computing a scaling coefficient on a basis of a ratio between the user body size data and the character body size data; and
- determining the position in the virtual space at which the virtual object is to be placed by using the detected information as to the position of the target object in the real space, the scaling coefficient, and the user body size data in the real space.

9. A non-transitory, computer-readable storage medium containing a computer program, which when executed by an information processing apparatus that generates an image in a virtual space to be presented to a user, causes the information processing apparatus to carry out actions, comprising:
- detecting information as to a position of a target object in a real space;
- placing a virtual object corresponding to the target object at a position in the virtual space obtained on a basis of the detected information as to the position of the target object in the real space;
- acquiring user body size data representing a size of a body of the user in the real space;
- acquiring character body size data representing a body size of a virtual character represented by a bone model including a plurality of nodes;
- determining the position in the virtual space at which the virtual object is to be placed, using the detected information as to the position of the target object in the real space, and the user body size data about the user in the real space;
- computing a scaling coefficient on a basis of a ratio between the user body size data and the character body size data; and
- determining the position in the virtual space at which the virtual object is to be placed by using the detected information as to the position of the target object in the real space, the scaling coefficient, and the user body size data in the real space.

* * * * *